May 3, 1960  R. CHIAPPULINI  2,935,289
TRACER APPARATUS
Filed Jan. 20, 1955  2 Sheets-Sheet 1
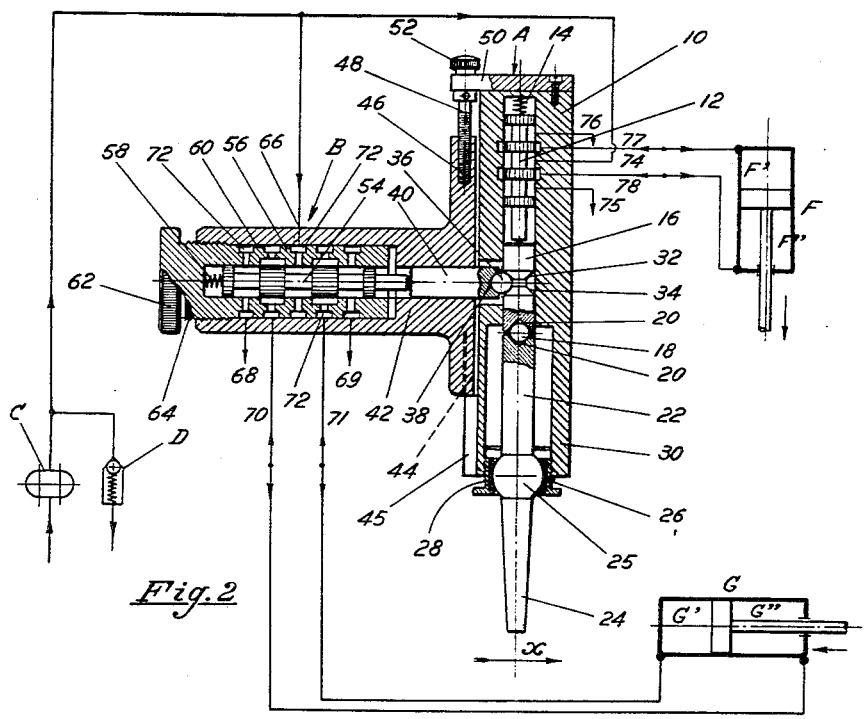
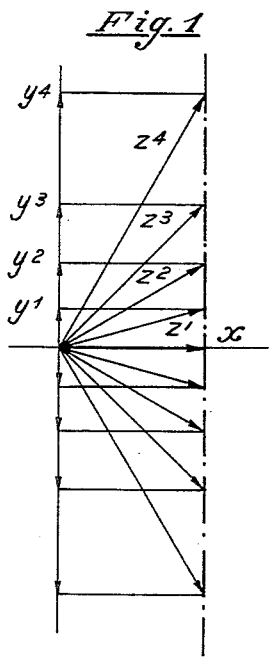
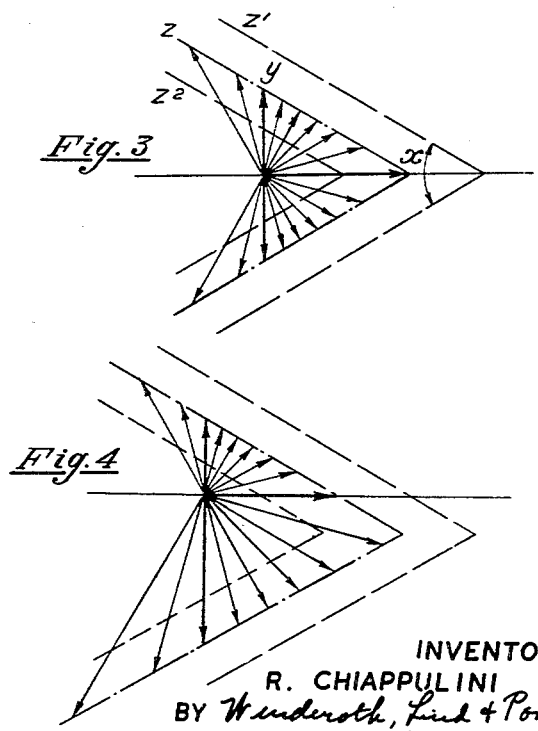
INVENTOR
R. CHIAPPULINI
BY Wenderoth, Lind & Ponack
Attys.

May 3, 1960   R. CHIAPPULINI   2,935,289
TRACER APPARATUS
Filed Jan. 20, 1955   2 Sheets-Sheet 2
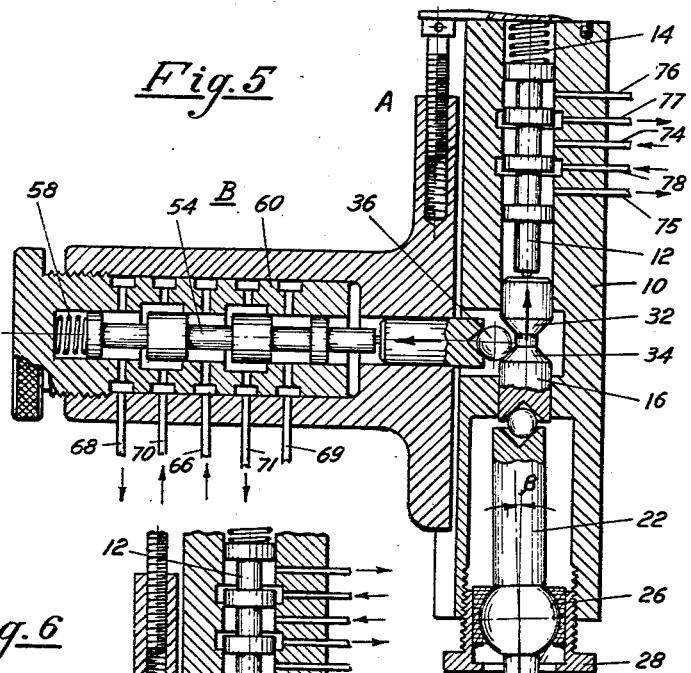
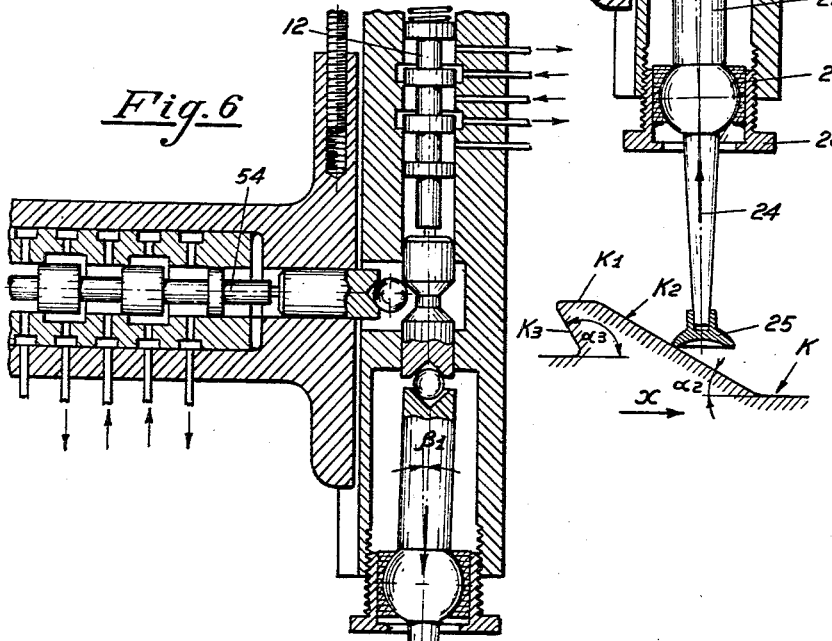
INVENTOR
RUGGERO CHIAPPULINI
BY Wenderoth, Lind & Ponack
ATTORNEYS United States Patent Office 2,935,289
Patented May 3, 1960

2,935,289
TRACER APPARATUS

Ruggero Chiappulini, Cuvio, Italy, assignor to Duplomatic S.R.L. Meccanica Applicazioni Oleodinamiche, Busto Arsizio, Italy, an Italian company Application January 20, 1955, Serial No. 482,972

Claims priority, application Italy June 19, 1954

2 Claims. (Cl. 251—3)

This invention relates to a device, to be fitted on copying apparatuses in general, and suitable for lathes, milling machines, filing machines and the like to control and co-ordinate one with another the main components of the relative motion between the workpiece and the tool, and thus also between the feeler and the template.

In the conventional copying apparatuses, of the hydraulic or other types, the motion imparted to machine tool worktable, whereon the template is also fitted, relative to tool and feeler, is independent of the amount of the displacement orthogonal to the first mentioned motion accomplished by the movable member of feeler, while the template is scanned. This results in difficulties, or inaccuracies of workpiece or the operation is sometimes made impossible, when steep slopes or undercuts are encountered on the profile of template. The forward motion imparted to the machine tool worktable is a constant and uniform one and therefore, the movement along the contour of finished piece will have, with respect to that of the template, greater deviations, the more said contour approaches a perpendicular to the direction along which the worktable moves.

The above drawback is clearly shown in Figure 1 of accompanying drawing, wherein the diagram of component motions of a conventional copying machine is shown.

More precisely, in said figure X is the forward or feed motion of the worktable, and Y is the motion accomplished by the feeler, relative to the profile or contour of a template.

The two component motions X and Y are perpendicular to each other and, as already stated, the formed component motion X is of a uniform nature. The component motion Y of feeler is, on the contrary of a continuously variable nature, and depends on the contour that is to be reproduced.

From the combination of said two motions, i.e. the constant motion X and the variable motion $Y_1, Y_2 \ldots Y_n$, some resultant motions $Z_1, Z_2, Z_3 \ldots Z_n$ are obtained, the values of which increase with the increase in the steepness of the template contour.

In practice, the maximum steepness which can be reproduced, is limited to values rather divergent from the perpendicular to feed motion X, i.e. having a difference not less than 20° or 30° therefrom.

In case one wants to exceed this limit, without however approaching the maximum limit case (i.e. that in which an angle of about 90° is encountered on the contour to be reproduced), thus causing motion X must be carried out manually, having also its speed to be greatly reduced, i.e. by an amount proportional to steepness of the contour which is to be reproduced.

Therefore, in this latter case, all automatic feed and control must be abandoned and all the unavoidable drawbacks which are inherent in manual control can occur.

The above mentioned drawbacks can be positively avoided by the present invention. The operation of the apparatus according to this invention is characterized in that a forced follow-up linkage is established between the motions of the workpiece (and thus of the template) and the movable member of the feeler, whereby each amount of motion which said movable member undergoes results in a preestablished and controlled amount of workpiece motion.

The device by which the aforedescribed method can be carried into practice, is characterized in that the movable member of the feeler is combined with means that are controlled by the motion of same movable member and which, in their turn, control the feed motion of the workpiece.

According to the invention at least one suitably shaped cam surface is formed on the movable member of the feeler, while the means by which the workpiece motion is controlled, shaped as cam-followers, are brought into an operating relation with said cam surface in such a manner that the motion of workpiece is dependent on the amount of relative motion accomplished by the movable member of feeler.

Thus, resultant motions are obtained which are always of automatically limited value and which may have any inclination relative to the feed motion of workpiece—even perpendicular thereto, or an angle greater than 90° when undercuts are to be machined. In the latter case, the feed motion of workpiece can be automatically reversed. As may be appreciated, the aforedescribed device can be combined with any known type of feeler. As a preferred, but not restrictive example, the combination with a feeler of the hydraulic type is very useful.

The invention will now be disclosed in detail with respect to the operating features and variants of the related device, in the following description—given only as an example—of a preferred embodiment thereof, taken with the accompanying drawing.

In the drawing:

Figure 1 shows a diagram of component motions in a conventional copying attachment.

Figure 2 is a vertical section in which some details of a preferred embodiment of the hydraulic device are diagrammatically shown, by which device the novel method can be carried into effect.

Figures 3 and 4 are vectorial diagrams related to the device in question, and

Figs. 5 and 6 are vertical sections similar to Fig. 2 showing the preferred embodiment in different conditions of operation.

Referring now particularly to Figure 2, A is a feeler of the hypdraulic type, to which the device B according to the invention has been fitted.

The A—B set is supplied in a well known manner, by a fluid pressure generating unit C, the fluid pressure being controlled by a relief valve D. The pressure fluid is delivered, as hereinafter stated, to cylinder-piston unit F—G, by which the orthogonal motions of the workpiece or of the tool and workpiece are controlled.

The whole unit (feeler A and device B) comprises a cylinder 10, within which is slidingly fitted a piston, held in position under the action of a spring 14.

The free end of distributing piston 12 cooperates with a slider 16, slidingly fitted and guided in the lower end of said cylinder 10.

The free end of said slider cooperates, through a ball 18 fitted in conical seats 20, with a rod 22, which outer end 24 forms the feeling point acting on the template and cooperating with the contour to be scanned.

Said rod 22 is provided with a ball joint 25, fitted substantially in the middle thereof, and a seat 26 therefor can be adjusted, within given limits, in a threaded sleeve 28 threaded on the lower end 30 of cylinder 10, and which can be adjusted thereon, in order to control the axial motion and stopping of said ball joint.

Cam surfaces 32—34 are formed on the middle section of slider 16. In the case in question, such cam surfaces all have the same inclination with respect to the axis of said slider, and form a groove wherein a ball 36 is seated. Said ball engages in a conical seat 38, machined on a slider 40, the axis of which is perpendicular to the axis of cylinder 10, the slider 40 being slidingly fitted on one end of a sleeve 42 which is provided, on said one end, with prismatic guides 44, having their axes parallel to axis of cylinder 10.

The guides 44 engage with corresponding counter-guides 45, provided at the outside and laterally of the cylinder 10.

A screw 48, rotatably fitted on a plate 50, that is secured to the upper end of cylinder 10, is threaded into a threaded hole, drilled in the upper section of one of guides 44.

Said screw 48 is provided with an adjusting knob 52, by which the sleeve 42 is moved along the axis of cylinder 10, for reasons which will be hereinafter set forth.

A distributing piston 54, one end of which cooperates with the free end of a slider 40, is slidingly fitted in a cylinder 56, and is urged by a spring 58 toward ball 36 thrusting the ball 36 against the cam surfaces 32—34 with a force smaller than that of spring 14.

The cylinder 56 is slidingly fitted in a suitable seat 60, machined in the sleeve 42, and is provided the projecting end thereof with a knob 62, and with a threaded portion 64, which threaded portion engages with a suitable mating thread, cut in the end of seat 60, to allow said cylinder 56 to be engaged therewith;

The sleeve 42 is also provided with suitably located nipples 66, 68, 69 and 70—71, leading into peripheral grooves cut in the outside of cylinder 56, and which are placed in communication, through radial holes drilled on cylinder 56, with the different chambers, defined by the piston 54 within said cylinder. This construction functions to keep a steady hydraulic connection between said chamber and the corresponding nipples, irrespective of axial motion imparted to cylinder 56.

The cylinder 10 is provided, in a like manner, with the nipples 74, 75, 76 and 76—77 leading into the different chambers, as defined therein by the piston 12.

The operation of the aforedescribed unit—shown in Figure 2 in its operating position—is as follows:

Assuming that the workpiece, together with the template, is moved in the direction X and that the template has a rising contour, then the finger tip 24, upon coming into contact with the template, will be moved in a counterclockwise direction, whereby it is caused to swing around the axis of ball joint 25.

In such a case, the ball 18 is caused to slide along the conical seats 20, and the slider 16 is moved axially.

The distributing piston 12 is thereby moved against the action of spring 14.

In the initial position, the location of said piston 12 is such as to prevent the pressure fluid from flowing (through the nipple 74) into both chambers F'—F'' of cylinder-piston unit F, whereby the piston of said unit is kept in its position.

When, therefore, the distributing piston is moved, say upwards, then a communication is established between the inlet nipples 74—77 and 75—78. Thus, the pressure fluid is fed into the chamber F', and the corresponding piston is moved downward, while the fluid already present in the chamber F'' is forced to the outlet through the nipples 78—75. Consequently, the worktable of machine tool, together with the template fitted thereon, will be moved downward or the tool, together with the key, is raised by an equal amount, whereby the tip 24 of feeler is brought again into its vertical position.

All previously stated communications will be broken by the distributing piston 12 under the action of spring 14. When a falling profile is encountered by the tip 24, then a reverse operation will take place; i.e. the communications between the nipples 74—78 and 77—76 are established, whereby the piston F is moved in a direction opposite to that previously described.

The motions performed by the slider 16 cause, through either cam surface 32 or 34, and through the ball 36, a displacement of the slider 40.

In case the piston 12 is moved upward, then the cam surface 34 of slider 16 will cause the distributing piston 54 to be moved from right to left.

Therefore, the nipple 66 is put into communication with the nipple 70, thus allowing the pressure fluid to flow into the chamber G'' of cylinder-piston unit G.

At the same time, the chamber G' is put into communication with the outlet through the nipples 71—69.

Thus the piston G will be moved from right to left with a speed proportional to size of the port which has been left open by the piston 54 in the cylinder 56.

Therefore, to each movement of the piston of the distributor 12 from its middle or locking position there corresponds a unidirectionally performed movement of distributing piston 54 controlling the piston G, whereby a corresponding motion is imparted to the workpiece, together with the former.

The diagram of the aforestated two motions is shown in Figure 3, wherein the two component motions X—Y give the resultant motion Z.

This figure shows that a very large number of different values Y can be related to same amount of motion X; this occurs because by acting on knob 62, the relative positions of ports in the cylinder 56 can be altered, in order to select the component motion X which is the most suitable for the required resulting advance.

In such a case the resultant motion Z can be moved from the position as shown in Figure 3, into the positions $Z_1$ or $Z_2$.

Thus, by means of aforedescribed regulation, it will be possible to reproduce contours even perpendicular to assumed direction X. In such a case the feeler tip 24 assumes such an inclination, that the distributing piston 54 takes the position as shown in Figure 2, and the communications toward the chambers G' and G'' are interrupted. It follows that only one motion, caused by the cylinder piston unit F will be performed, i.e. the worktable is moved downward and then kept still horizontally.

In a like manner undercut contours can be reproduced.

By acting on threaded sleeve 28, the downward motion of feeler tip 24 can be adjusted, thus limiting the backward inclination of the copying attachment during the free downward motion as well as the maximum reverse sloping section (or cut) to be machined.

As shown in Figure 4, by acting on the adjustment screw 48, the vertex of the resultant motions Z can be moved when required by the operating conditions.

Referring to Figures 5 and 6 which corresponds to Fig. 2 the device is arranged in such a manner as to control two motions X and Y in a vertical plane.

The working table of a vertical milling machine, that is the table with horizontal motion is driven from the motor G, and the tool (or the working piece) are vertically displaced one another by the motor F. The motors F—G are of the hydraulic kind, piston or rotating motors.

When the feeler 25' of the device cooperates with a horizontal surface of pattern K then the feeler 22 is slightly raised so that the piston 12 cuts off communication, whereas the piston 54 opens passage ports to establish a communication between the tubes 66—71 and 69—70, thus forming a hydraulic circuit for the motor G, that controls the workpiece table (which is not shown in the drawing and which supports the pattern K) by moving it in the sense of arrow X (Fig. 5).

When the feeler 25' touches a sloping part of pattern portion $K_2$ (Fig. 5), then an inclination (angle $\beta$) of the feeler rod 22 takes place and the sliding member 16 is raised to move the piston 12, which establishes a communication between the tubes 74—77 and 75—78. Then the motor F operates and causes a vertical motion of the workpiece table to move the tool and working piece away from each other. This corresponds to a removal of feeler 25' from pattern K.

Motion of sliding member 16 also causes the ball 36 to be engaged by the shaped surface 36 and motion of piston 54 from right to left (Fig. 5) to throttle and eventually cut off the communication between tubes 66—71 and 68—70. The speed of motor G is therefore reduced until it stops when the angle $\alpha_2 = 90°$.

If the feeler bears against an undercut surface, such as the surface $K_3$ for which inclination $\alpha_3$ is greater than 90°, then said feeler, after overcoming the edge $K_1$—$K_3$ disengages for a moment from pattern K, and its rod 22 moves vertically to a lower position, so that the seat 26 for the ball joint fitted on rod 22 is held up by a flange of threaded bushing 28. The sliding member 16 lowers under the action of spring 14 acting on piston 12, whereas the piston 54 is at first moved from left to right (Fig. 6) under the action of spring 58, that is until engagement of the ball 36 with the walls 32—34 of the sliding member groove. Then the piston 54 is moved from right to left, due to engagement of seat 26 with the flange of threaded bushing 28 (Fig. 6) by cutting off at first the communication between the tubes 66—71 and 68—70, whereas said piston 54, after engaging the feeler 25' with the surface $K_3$ and inclination=$\beta_1$ of the rod 22, establishes a communication between the tubes 66—70 and 69—71, as shown in Fig. 6. The feeding circuit of motor G is reversed and the workpiece table is moved in the direction Y (Fig. 6).

Lowering of rod 22 causes also lowering of piston 12 by establishing a communication between tubes 74—78 and 76—77 and the motor F is therefore controlled in such a manner, that the distance between tool and associated workpiece (that is between feeler 25' and pattern K) is reduced, and said motion continues until feeler 25' reaches the bottom surface $K_4$.

The above described operation also occurs when the surfaces to be shaped are arranged in a vertical instead of a horizontal plane, inasmuch as the tool always works to outline a well determined pattern contour. In such a case the workpiece table moves in two directions in a horizontal plane, that is the motor F operates the workpiece table in a direction which is orthogonal to that of motor G.

By taking into account what has been stated above, it will be understood that changes and variations might be made in the aforedescribed device, according to different requirements and operative features.

Thus for instance, the cam surface 32—34 could have the most suitable contour for carrying out the purpose of said invention.

In a like manner, a given ratio could be established for the diameters of distributing pistons 12 and 54 and of corresponding cylinders, in order to change the angle $\beta$ of the resultant motion Z with respect to the axis X.

Moreover, the angle between the axis of cylinder 10 and the axis of cylinder 56 could be suitably varied, and in addition it could be adjusted from time to time.

Likewise, the cam surfaces 32—34 could be formed, in a wholly equivalent manner, on the piston 54 instead of on piston 12.

While the invention has been described in some detail, it is to be understood that the description is for the purpose of illustration only, and is not definitive of the limits of the inventive idea. The right is reserved to make such changes in the details of construction and arrangement of parts, as will fall within the scope of the attached claims.

I claim:
1. A tracer apparatus comprising a first distributing piston, a first cylinder having a plurality of fluid ports therein and in which said first distributing piston is slidably fitted, spring means urging said first distributing piston out of said cylinder, a rod on which said first distributing piston bears, a feeler tip on which said rod bears, said feeler tip moving said first distributing piston through said rod, said rod having two inclined profile cam faces thereon defining a circumferential groove therein, a ball partially in said groove for operating with said two profile surfaces, a second distributing piston in contact with said ball and actuated thereby, the second cylinder having a plurality of fluid ports therein in which said second distributing piston is slidably fitted, said first distributing piston and cylinder and said second distributing piston and cylinder controlling flow of hydraulic fluid, and a second spring means acting on said second distributing piston urging said second distributing piston against said ball with a force less than the force with which said spring means acts on said first distributing piston.

2. A tracer apparatus comprising a first distributing piston, a first cylinder having a plurality of fluid ports therein and in which said first distributing piston is slidably fitted, spring means urging said first distributing piston out of said cylinder, a rod on which said first distributing piston bears, a feeler tip on which said rod bears, said feeler tip moving said first distributing piston through said rod, said first distributing piston, rod and feeler being aligned, said rod having two inclined profile cam surfaces thereon defining a circumferential groove therein, a ball partially in said groove for operating with said two profile surfaces, a second distributing piston in contact with said ball and actuated thereby, the second cylinder having a plurality of fluid ports therein in which said second distributing piston is slidably fitted, said second cylinder and distributing piston being perpendicular to said first cylinder and said first distributing piston, said first distributing piston and cylinder and said second distributing piston and cylinder controlling flow of hydraulic fluid, and a second spring means acting on said second distributing piston urging said second distributing piston against said ball with a force less than the force with which said spring means acts on said first distributing piston, and a sleeve into which said second cylinder is slidably fitted, guide means on the end of said sleeve extending transversely to the axis thereof, corresponding means on said first cylinder extending in the longitudinal direction of said first cylinder with which said guide means cooperates, and guide adjusting means on said first cylinder for adjusting said sleeve with respect to said cylinder.

References Cited in the file of this patent

UNITED STATES PATENTS

| | | |
|---|---|---|
| 2,332,533 | Roehm | Oct. 26, 1943 |
| 2,433,005 | Turchan et al. | Dec. 23, 1947 |
| 2,618,244 | Roehm | Nov. 18, 1952 |